Jan. 11, 1944.   H. A. PETERSON   2,339,103
TRANSFORMER SYSTEM
Filed Dec. 26, 1942
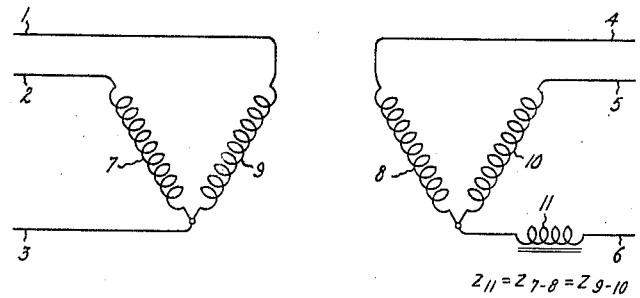
Inventor:
Harold A. Peterson
by Harry E. Dunham
His Attorney.

Patented Jan. 11, 1944

2,339,103

UNITED STATES PATENT OFFICE 2,339,103

TRANSFORMER SYSTEM

Harold A. Peterson, Scotia, N. Y., assignor to General Electric Company, a corporation of New York Application December 26, 1942, Serial No. 470,248

3 Claims. (Cl. 172—238)

This invention relates to transformer systems and more particularly to improvements in open-delta-connected transformer systems.

The so-called open-delta transformer connection is well known in the art. It differs from a conventional closed-delta connection in that one of the transformers or phases is omitted. With the same heating it can transmit fifty-seven percent of the power that can be transmitted when the delta is closed and it is therefore used in locations where the load is expected to grow. It is also used when one transformer of a closed-delta connection fails and it is sometimes supplemented by forced cooling so as to permit overloading in case a reduction in power transmitted cannot be tolerated. Still another use is with autotransformer type voltage regulators, such, for example, as when two single-phase induction voltage regulators are connected open-delta for regulating the voltage of a three-phase circuit.

Recent study of the open-delta connection has revealed that it produces certain undesirable effects. For example, when a three-phase induction motor is fed through such a transformer connection there is more heating in the motor, for the same load, than there is when the delta connection is closed.

In an application of Edith Clarke, Serial No. 470,249, filed Dec. 26, 1942, and assigned to the present assignee it is shown that if two series capacitors are connected respectively in the conductors which make connection to the terminals of the open side of the delta and if the effective reactance of these capacitors equals the leakage reactance of the respective single-phase transformers with which they are serially connected, when referred to the side of the transformer in which the capacitors are connected, the above-mentioned undesirable effects are eliminated.

I have found that similar results are obtained when I connect a reactor in series in the line conductor which connects to the vertex or common terminal of the open-delta connection and provide this reactor with an impedance equal to the leakage impedance of the individual phases of the open-delta-connected transformer when referred to the same electrical side of the transformer as that in which the reactor is connected. This presupposes equal leakage impedance of the two phases of the open-delta-connected transformer system. It should, of course, also be understood that the reactor can be divided into two parts which are connected respectively in the primary and secondary sides of the transformer system and whose over-all impedance is substantially equal to the sum of the primary and secondary leakage impedance of one phase of the transformer system.

An explanation of my improved result is that the open-delta connection acts in one way like an unbalanced series inductive impedance and the unbalanced inductive impedance of the series reactor combines therewith to remove the unbalance.

That the unbalance of the equivalent series impedance of an open-delta-connected transformer will produce objectionable effects, such as harmful motor heating, can be seen from the following. When a balanced load is connected to the circuit the positive sequence load currents which flow through the unbalanced equivalent series impedance produce negative sequence voltages. These negative sequence voltages cause the flow of negative sequence currents which produce objectionable heating and losses. For example, the negative sequence voltage across the terminals of an induction motor will give rise to double frequency currents induced in the motor rotor and these currents cause undesirable losses and heating.

An object of the invention is to provide a new and improved electric circuit.

Another object of the invention is to provide a new and improved open-delta-connected transformer system.

A further object of the invention is to provide an improved open-delta-connected transformer system whose equivalent series reactance is balanced in a novel manner.

The invention will be better understood from the following description taken in connection with the accompanying drawing and its scope will be pointed out in the appended claims.

Referring now to the single figure of the accompanying drawing which illustrates diagrammatically an embodiment of the invention, there is shown therein a three-phase power system consisting of a first three-phase circuit 1, 2 and 3 and a second three-phase circuit 4, 5 and 6. Interconnecting these circuits is an open-delta-connected transformer system comprising, by way of example, a pair of similar single-phase insulating transformers, one of which has windings 7 and 8 connected respectively between the conductors 2—3 and 4—6, and the other of which has a pair of windings 9 and 10 connected respectively between the conductors 1—3 and 5—6.

For balancing the unbalanced effective series impedance of this open-delta transformer connection a reactor 11 is connected in series with the conductor 6, that is to say, it is connected in series with a conductor which connects to the vertex or corner of the open-delta connection. The effective inductive impedance $Z_{11}$ of reactor 11 is made equal to the leakage impedance $Z_{7-8}$ between the windings 7 and 8 when referred to the circuit 4—5—6 and to the effective leakage impedance $Z_{9-10}$ between the windings 9 and 10 when referred to the circuit 4—5—6. The leakage impedances or equivalent series impedances of the two transformers which are connected open-delta are equal.

By means of the above-described connection the effective series impedance between the circuits 1—2—3 and 4—5—6 is balanced for all three phases so that the combination of the open-delta transformer and the reactor 11 will produce no negative phase sequence voltages with a balanced load.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. In combination, a three-phase power system, an open-delta-connected transformer system connected in said power system for transforming the power flow therethrough, and impedance means serially connected in the phase of said power system which connects to a common terminal of the open-delta connection, said impedance means being such that the over-all regulation of said open-delta-connected transformer and said impedance means is substantially balanced with respect to all three phases of said power system.

2. In combination, a three-phase power line, an open-delta-connected transformer system connected in said line, the two phases of said transformer system having substantially equal leakage impedance, and a reactor connected in the phase conductor of said line which makes connection with one corner of the open-delta connection on one electrical side of said transformer system, the impedance of said reactor being substantially equal to the leakage impedance of the phases of said open-delta-connected transformer system.

3. In combination, an open-delta-connected transformer system whose two phases have equal leakage impedance, and an impedance having the same impedance with respect to both magnitude and power factor that said leakage impedance has connected in series with the common terminal of said transformer system on one electrical side thereof.

HAROLD A. PETERSON.